United States Patent
Eluru et al.

(10) Patent No.: US 11,674,368 B2
(45) Date of Patent: *Jun. 13, 2023

(54) SALTING OUT INHIBITORS FOR USE IN TREATMENT FLUIDS

(71) Applicant: Halliburton Energy Services, Inc., Houston, TX (US)

(72) Inventors: Sairam Eluru, Bangalore (IN); Pratiksha Shivaji Meher, Maharashtra (IN); Chetan Prakash, Maharashtra (IN); Sandeep Kumar Borra, Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,360

(22) Filed: Jun. 7, 2022

(65) Prior Publication Data

US 2022/0298894 A1 Sep. 22, 2022

Related U.S. Application Data

(63) Continuation of application No. 16/972,945, filed as application No. PCT/US2018/042594 on Jul. 18, 2018, now Pat. No. 11,384,624.

(51) Int. Cl.
*C09K 8/68* (2006.01)
*E21B 43/04* (2006.01)
(Continued)

(52) U.S. Cl.
CPC .............. *E21B 43/04* (2013.01); *C09K 8/68* (2013.01); *C09K 8/80* (2013.01); *E21B 43/267* (2013.01)

(58) Field of Classification Search
None
See application file for complete search history.

(56) References Cited

U.S. PATENT DOCUMENTS

| 5,304,620 A | 4/1994 | Holtmyer et al. |
| 11,384,624 B2 * | 7/2022 | Eluru ............... E21B 43/04 |

(Continued)

FOREIGN PATENT DOCUMENTS

| WO | 2014/209447 A1 | 12/2014 |
| WO | 2017/131704 A1 | 8/2017 |

OTHER PUBLICATIONS

International Search Report and Written Opinion issued in related PCT Application No. PCT/US2018/042594 dated Apr. 9, 2019, 10 pages.

(Continued)

*Primary Examiner* — Andrew Sue-Ako
(74) *Attorney, Agent, or Firm* — Thomas Rooney; C. Tumey Law Group PLLC (57) ABSTRACT

Methods and system for using salting out inhibitors in subterranean formations are provided. In some embodiments, the methods comprise introducing a treatment fluid comprising an aqueous base fluid, a salting out inhibitor, a gelling agent, and one or more salts into at least a portion of a subterranean formation, wherein the salting out inhibitor is selected from the group consisting of: an oligomer comprising one or more quaternary ammonium cations, a polymer comprising one or more quaternary ammonium cations, a source of one or more phosphate anions, and any combination thereof.

20 Claims, 5 Drawing Sheets

(51) Int. Cl.
      *C09K 8/80*     (2006.01)
      *E21B 43/267*   (2006.01)

(56) References Cited

U.S. PATENT DOCUMENTS

| | | |
|---|---|---|
| 2003/0173087 A1 | 9/2003 | Kirk |
| 2005/0261138 A1 | 11/2005 | Robb et al. |
| 2006/0205606 A1 | 9/2006 | Pauls et al. |
| 2006/0247135 A1 | 11/2006 | Welton et al. |
| 2014/0202695 A1 | 7/2014 | Suryawanshi et al. |
| 2014/0378353 A1 | 12/2014 | Salgaonkar |
| 2015/0368544 A1 | 12/2015 | Angman et al. |
| 2018/0362830 A1 | 12/2018 | Eluru et al. |

OTHER PUBLICATIONS

AquaLinear HT High Temperature Gravel Pack Fluid Service, Sand Control, Halliburton Energy Services, H06780, Dec. 2012, 2 pages.
Office Action Summary for U.S. Appl. No. 16/972,945 dated Nov. 19, 2021.
Notice of Allowance for U.S. Appl. No. 16/972,945 dated Apr. 5, 2022.

* cited by examiner

SALTING OUT INHIBITORS FOR USE IN TREATMENT FLUIDS

BACKGROUND

The present disclosure relates to methods and compositions for use in subterranean formations, and more specifically, to additives for high density brines and methods for use. In industrial and oil field operations, viscosified or gelled treatment fluids are often used in subterranean formations. Examples of subterranean operations that use such viscosified treatment fluids include servicing and completion operations such as fracturing and gravel packing. In fracturing, a gelled fracturing fluid may be used to carry proppant to fractures within the formation, for example, to maintain the integrity of those fractures to enhance the flow of desirable fluids to a well bore. In gravel packing operations, a gelled fluid including gravel may be used to reduce the migration of unconsolidated formation particulates into a wellbore in a subterranean formation. During gravel packing operations, gravel such as sand or proppant may generally be carried to a wellbore by a gravel packing fluid, which may be gelled to increase its viscosity and improve its ability to carry gravel. The gravel packing fluid may be pumped into a wellbore in which the gravel pack is to be placed. The base fluid of the gravel packing fluid may leak off into the subterranean zone and/or return to the surface while the gravel is left in the zone to form a gravel pack. The resultant gravel pack may act as a filter to separate formation sands from produced fluids while permitting the produced fluids to flow into the wellbore. Typically, gravel pack operations may involve placing a gravel pack screen in the wellbore and packing the surrounding annulus between the screen and the wellbore with gravel designed to prevent the passage of formation sands through the pack. Such gravel packs may be used to stabilize the formation while causing minimal impairment to well productivity. Screenless gravel packing operationVs may also be performed.

Viscosified treatment fluids may be a gel formed by viscosifying aqueous-based fluids (e.g., a brine) with a gelling agent. Certain gelling agents used in treatment fluids may salt out (i.e., precipitate out of solution) in concentrated brines, which may render the treatment fluid less effective. Without being bound by theory, it is believed that anionic portions of the gelling agents interact with a cationic moiety from the salt, resulting in precipitation and salting out. Additionally, anionic moieties of polymeric gelling agents may crosslink with the cation moieties of the salt, increasing the viscosity of the treatment fluid. Increased viscosity may lead to less efficient treatment operations, higher pump pressure, or risk of damaging shunt tubes in shunt tube operations.

BRIEF DESCRIPTION OF THE DRAWINGS

These drawings illustrate certain aspects of some of the embodiments of the present disclosure and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

The present disclosure relates to methods and compositions for use in subterranean formations, including additives for high density brines and methods for use. More specifically, the present disclosure provides methods including: introducing a treatment fluid comprising an aqueous base fluid, a salting out inhibitor, a gelling agent, and one or more salts into at least a portion of a subterranean formation, wherein the salting out inhibitor is selected from the group consisting of: an oligomer comprising one or more quaternary ammonium cations, a polymer comprising one or more quaternary ammonium cations, a source of one or more phosphate anions, and any combination thereof.

In certain embodiments, the present disclosure provides methods including: forming a treatment fluid comprising an aqueous base fluid, a salting out inhibitor, a gelling agent, and one or more salts, wherein forming the treatment fluid comprises: providing a first fluid comprising the aqueous base fluid, the gelling agent, and the salting out inhibitor, and adding the one or more salts to the first fluid; and placing the treatment fluid into at least a portion of a subterranean formation.

In some embodiments, the present disclosure provides systems including: a treatment fluid comprising an aqueous base fluid, a salting out inhibitor, a gelling agent, one or more salts, and a gravel material, wherein the salting out inhibitor is selected from the group consisting of: an oligomer comprising one or more quaternary ammonium cations, a polymer comprising one or more quaternary ammonium cations, a source of one or more phosphate anions, and any combination thereof; a production tubing; a screen coupled to the production tubing; and a pumping system fluidically coupled to the production tubing, wherein the pumping system is capable of pumping the gravel packing fluid through the production tubing.

Among the numerous advantages of the present disclosure, the methods, compositions, and systems of the present disclosure may allow for the use of gelling agents in high density brines that would typically salt out at high salt concentrations. Additionally, the methods, systems, and compositions of the present disclosure may reduce apparent fluid viscosity in brines by reducing crosslinking. In certain embodiments, without being limited by theory, the salting out inhibitor may improve the salt tolerance of the gelling agent and prevent undesired cross-linking. The salting out inhibitor may, in certain embodiments, also provide some degree of clay inhibition. Accordingly, in certain embodiments, the treatment fluids of the present disclosure may provide high-density gravel packing fluids with desirable sand settling properties and lower viscosities than typical gels without the salting out inhibitor, which may result in lower pumping friction and horse power consumption and may lower the risk of improper gravel packing, fracture generation, and damage to shunt tubes.

In certain embodiments, the treatment fluid may be a gravel packing fluid. Gravel packing fluids used in gravel packing operations may include a gel formed by viscosifying aqueous-based fluids (e.g., a brine) with a gelling agent. In some embodiments, gelling the treatment fluid may improve its ability to carry gravel.

The gelling agent may comprise any material suitable to viscosify and gel an aqueous-based fluid. In some embodiments, the gelling agent comprises at least one anionic moiety. In certain embodiments, the treatment fluid may include a polysaccharide gelling agent. Polysaccharide gelling agents suitable for certain embodiments of the present disclosure may include, but are not limited to, xanthan, scleroglucan, diutan, succinoglycan, guar, hydroxyethyl cellulose, any derivative of the foregoing, and any combination thereof. In some embodiments, the gelling agent may include a synthetic gelling agent such as a synthetic polymer. Synthetic gelling agents suitable for certain embodiments of the present disclosure include, but are not limited to polyacrylamide, copolymers of acrylamide and another monomer, polyvinylalcohol, polyvinylpyrollidone, polyvinylacetate, polymethacrylate, any derivative thereof, and any combination thereof. The gelling agent may be present in the treatment fluids in an amount within a range of from about 10 pounds per thousand gallons (lb/Mgal) to about 300 lb/Mgal, alternatively from about 25 lb/Mgal to about 100 lb/Mgal, or to about 50 lb/Mgal, 75 lb/Mgal, 150 lb/Mgal, 200 lb/Mgal, or 250 lb/Mgal, all by volume of the treatment fluid.

In certain embodiments, the treatment fluid may have an apparent viscosity of about 5 centipoise (cP) to about 1000 cP at a shear rate of 100 $\sec^{-1}$, or about 10 cP to about 2500 cP at a shear rate of 100 $\sec^{-1}$, or from about 10, 15, 20, 25, 30, 35, 40, 45, 50, 55, 60, 65, 70, 75, 80, 85, 90, 95, or 100 cP to about 200, 300, 500, 700, or 900 cP at a shear rate of 100 $\sec^{-1}$. In some embodiments, after the addition of the salting out inhibitor and the one or more salts, the treatment fluid may have an apparent viscosity of about 100 cP or less at a shear rate of 100 $\sec^{-1}$ and a temperature of about 250° F.

In some embodiments, the treatment fluids may include a salting out inhibitor. In certain embodiments, the salting out inhibitor may allow for the use of gelling agents with fluids with higher salt concentrations without "salting out" or precipitation of the gelling agent. In some embodiments, the salting out inhibitor may reduce or prevent cross-linking of the gelling agent, which may reduce the viscosity of the treatment fluid. Without being bound by theory, it is believed that a salting out inhibitor may at least partially occupy or block the anionic groups of a gelling agent, hindering or preventing cationic moieties from the salts in the treatment fluid from reaching the anionic groups of the gelling agent, thereby reducing precipitation and undesired crosslinking. In some embodiments, the salting out inhibitor may comprise a higher transport number compared to a cationic moiety from a salt (e.g., calcium or bromine) and may have a weak hydration capacity. In certain embodiments, it is believed that a salting out inhibitor may bond to and sequester cationic ions from the one or more salts, hindering or preventing the cationic moieties from interacting with the gelling agent and thereby reducing precipitation and undesired crosslinking. In some embodiments, the salting out inhibitor may also provide some degree of clay inhibition.

Salting out inhibitors suitable for certain embodiments of the present disclosure include, but are not limited to an oligomer comprising one or more quaternary ammonium cations, a polymer comprising one or more quaternary ammonium cations, a source of one or more phosphate anions, and any combination thereof. In certain embodiments, the salting out inhibitor may be a compound comprising one or more quaternary ammonium moieties, such as quaternary ammonium polymers or quaternary ammonium oligomers. In some embodiments, the salting out inhibitor may comprise an oligomer comprising at least one quaternary ammonium moiety or a polymer comprising at least one quaternary ammonium moiety. In some embodiments, the salting out inhibitor may comprise one or more quaternary ammonium salts. In certain embodiments, the salting out inhibitor may comprise a polyquaternium compound, including, but not limited to a polyquaternium polymer. Polyquaternium polymers suitable for certain embodiments of the present disclosure include, but are not limited to, polyquaternium-10 (quaternized hydroxyethyl cellulose), polyquaternium-7 (copolymer of acrylamide and diallyldimethylammonium chloride), polyquaternium-11 (copolymer of vinylpyrrolidone and quaternized dimethylamino ethyl methacrylate), and any combination thereof. In some embodiments, the salting out inhibitor may comprise any polyquaternium compound, including polyquaternium-1 through polyquaternium-44. In certain embodiments, the salting out inhibitor may include a source of a phosphate anion. The source of the phosphate anion may be polymeric. In certain embodiments, the source of the phosphate anion may comprise an ester of phosphonic acid. Sources of phosphate anions suitable for certain embodiments of the present disclosure may include, but are not limited to polyacrylate, a polyacrylate derivative, a hydroxyl propyl starch phosphate, and any combination thereof. The salting out inhibitor may be present in the treatment fluids in a range of from about 0.05 gallons per thousand gallons (gal/Mgal) to about 100 gal/Mgal by volume of the treatment fluid. In certain embodiments, the salting out inhibitor may be present in the treatment fluids in a range of from about 1 to about 10 gal/Mgal, from about 1 gal/Mgal to about 25 gal/Mgal, from about 10 to about 30 gal/Mgal or from about 10 to about 50 gal/Mgal, all by volume of the treatment fluid. In some embodiments, the salting out inhibitor may be present in the treatment fluids in an amount less than about 25 gal/Mgal by volume of the treatment fluid. In some embodiments, the salting out inhibitor may be present in the treatment fluids in an amount greater than about 10 gal/Mgal by volume of the treatment fluid.

In some embodiments, the treatment fluids may include a gravel material. As used herein, "gravel material" may be any particulate matter used to filter sand or other similar particulate solids from the production fluid or other such produced fluids. Examples of gravel material suitable for certain embodiments of the present disclosure include, but are not limited to sand, ceramics, any type of proppant, or any type of sized solid particulate. In certain embodiments, the gravel may be used with a screen to aid in filtration or to assist in placement of the gravel in loosely consolidated or unconsolidated formations. In some embodiments, gravel may be pre-sized to a specific desirable size. If a screen is used, the gravel may be sized at a size greater than the screen apertures. In certain embodiments, the gravel may have a size in the range of from about 0.0083 inch to about 0.0661 inch in diameter. In some embodiments, the gravel may have a size of $^{12}/_{18}$, $^{16}/_{30}$, $^{20}/_{40}$, $^{30}/_{50}$, or $^{40}/_{70}$ U.S. mesh. The gravel may be included in the treatment fluid in an amount in the range of from about 0.5 pounds added per gallon (ppg) to about 10 ppg, alternatively from about 1 ppg to about 7 ppg, alternatively from about 2 ppg to about 4 ppg, or about 6 ppg, 7 ppg, or 8 ppg. In certain embodiments, the gravel may be carried in the treatment fluid to a subterranean formation location where filtration (e.g., sand control) is needed and placed in at least a portion of the subterranean formation. In some embodiments, the treatment fluid may exhibit 20% sand settling or less over 30 minutes. In certain embodiments, the treatment fluid may exhibit 10% sand settling or less over 30 minutes.

In certain embodiments, the treatment fluid may comprise a proppant material. A proppant may be in the form of a solid particulate, which can be suspended in a treatment fluid, carried downhole, and deposited in the fracture to form a proppant pack. The proppant pack may prop a fracture in an open condition while allowing fluid flow through the pack. In some embodiments, a proppant pack in the fracture provides a higher-permeability flow path for the oil or gas to reach the wellbore compared to the permeability of the matrix of the surrounding the subterranean formation. Proppant materials suitable for certain embodiments of the present disclosure include, but are not limited to silica sand, ground nut shells, ground fruit pits, sintered bauxite, glass, plastics, ceramic materials, processed wood, composite materials, resin coated particulates, and any combination thereof. Mixtures of different kinds or sizes of proppant may be used as well. In certain embodiments, the proppant material may be present in the treatment fluid within a range of from about 0.1 lb/gal to about 25 lb/gal by volume of the treatment fluid.

In some embodiments, a gel breaker may be added to the treatment fluid. A gel breaker may be used, for example, to break a gelled treatment fluid. In certain embodiments, the gel breaker may be in a second treatment fluid that contacts the gelled treatment fluid. Examples of gel breakers suitable for certain embodiments of the present disclosure include, but are not limited to oxidizers such as sodium bromate, sodium chloride, manganese dioxide, or any combination thereof. In certain embodiments, a treatment fluid may be broken by raising the pH to about 7 or greater (for example, by contacting the gelled treatment fluid with a second treatment fluid with a higher pH). In some embodiments, the gel breaker may be a delayed-release gel breaker. For example, a delayed release gel breaker may be a prepared by encapsulating a gel breaker in an encapsulation material that is soluble or slowly degradable in a treatment fluid or other wellbore fluid. Examples of encapsulation materials suitable for certain embodiments of the present disclosure include, but are not limited to porous materials (e.g., precipitated silica, alumina, zeolites, clays, hydrotalcites), EPDM rubber, polyvinylidene chloride, polyamides, polyurethanes, cross-linked and partially hydrolyzed acrylate polymers, and the like. In some examples, degradable polymers may be used to encapsulate a gel breaker. In certain embodiments, the gel breaker may be present in the treatment fluid in an amount in the range of from about 0.001% to about 0.5% by volume of the treatment fluid, alternatively about 0.01% to about 0.3% by volume of the treatment fluid, or further alternatively, about 0.1% to about 0.2% by volume of the treatment fluid.

In certain embodiments, the treatment fluid may comprise a non-emulsifier or any such additive used to control emulsion formation in the treatment fluids. Examples of non-emulsifiers suitable for certain embodiments of the present disclosure include, but are not limited to ionic and nonionic surfactants, foaming agents, or any combination thereof. In some embodiments, the non-emulsifiers may be present in the treatment fluids in an amount in a range of from about 0.1% v/v to about 10% v/v by volume of the treatment fluid. For example, the non-emulsifiers may be present in the treatment fluid in an amount in a range of from about 1% v/v to about 9% v/v, alternatively about 2% v/v to about 8% v/v, or further alternatively, to about 3% v/v, about 4% v/v, about 5% v/v, about 6% v/v, or about 7% v/v, all by volume of the treatment fluid.

In some embodiments, the treatment fluids may include an iron control agent. An iron control agent may, for example, reduce the precipitation of iron. Examples of iron control agents suitable for certain embodiments of the present disclosure include, but are not limited to reducing agents, chelates, and any combination thereof. In certain embodiments, the iron control agent may include sodium citrate, potassium citrate, acetic anhydride, or any combination thereof. The iron control agents may be included in the treatment fluids in an amount in a range of from about 0.01% w/v to about 1% w/v by volume of the treatment fluid. For example, the iron control agents may be included in the treatment fluids in an amount in a range of about 0.1% w/v to about 0.9% w/v, alternatively about 0.2% w/v to about 0.8% w/v, or further alternatively, to about 0.3% w/v, about 0.4% w/v, about 0.5% w/v, about 0.6% w/v, or about 0.7% w/v, all by volume of the treatment fluid.

In certain embodiments, the treatment fluids may comprise a gel stabilizer. Without being limited by theory, it is believed that the gel stabilizer may help to prevent premature gel degradation by scavenging oxygen from the fluid. In some embodiments, the gel stabilizer may include an alkali metal thiosulfate (e.g., sodium thiosulfate). The gel stabilizer may be present in the treatment fluid in an amount of from about 1 lb/Mgal to about 200 lb/Mgal by the volume of water in the treatment fluid.

In certain embodiments, the treatment fluids may comprise a thermal stabilizer. Thermal stabilizers may include one or more non-sulfur antioxidants that increase the thermal stability of the polysaccharide gelling agent. Thermal stabilizers suitable for certain embodiments of the present disclosure include, but are not limited to ascorbic acid, a salt of ascorbic acid (e.g., sodium ascorbate), erythorbic acid, a salt of erythorbic acid (e.g., sodium erythorbate), tocopherol, a derivative of the foregoing, and any combination thereof. In some embodiments, the thermal stabilizers may be present in the treatment fluids in an amount in a range of about from 5 lb/Mgal to about 300 lb/Mgal, from about 10 lb/Mgal to about 50 lb/Mgal, from about 25 lb/Mgal to about 100 lb/Mgal, or to about 150 lb/Mgal, about 200 lb/Mgal, or to about 250 lb/Mgal, all by volume of the treatment fluid. Without being bound by theory, it is believed that the thermal stabilizers may function by removing oxygen radicals from the treatment fluids. For example, in certain embodiments, oxygen radicals may break the ether linkages of a polysaccharide gelling agents. At higher temperatures, the prevalence of oxygen radicals may be increased, leading to acceleration in the breakdown of the polysaccharide gelling agents. In contrast to antioxidants that contain sulfur and may be subject to environmental regulations, the non-sulfur antioxidants may not damage the environment, allowing their use in locations that are subject to strict environmental regulations.

In some embodiments, the treatment fluids may include an antioxidant stabilizer. In certain embodiments, the antioxidant stabilizer may increase temperature stability when added along with a thermal stabilizer. Examples of antioxidant stabilizers suitable for some embodiments of the present disclosure include, but are not limited to hydroxylamines such as alkylhydoxylamines. In certain embodiments, the antioxidant stabilizer may be isopropylhydroxylamine. In some embodiments, the antioxidant stabilizers may have a molecular weight of less than about 400. A ratio of the antioxidant stabilizers to thermal stabilizers may range, for example, from about 1:1 to about 3:1. The antioxidant stabilizers may be present in the treatment fluids in an amount in a range of from about 2 lb/Mgal to about 100 lb/Mgal, alternatively from about 5 lb/Mgal to about 25 lb/Mgal, alternatively from about 10 lb/Mgal to about 20 lb/Mgal, or to about 50 lb/Mgal, about 70 lb/Mgal, or about 90 lb/Mgal, all by volume of the treatment fluid. Without being bound by theory, it is believed that the antioxidant stabilizers may increase the effective working temperature range of the thermal stabilizers, thus allowing the thermal stabilizers to stabilize polysaccharide gelling agents at higher temperatures.

In some embodiments, the treatment fluids may be used in a subterranean formation having a bottom hole static temperature of up to about 300° F., 325° F., or 350° F., or higher. In some embodiments, the treatment fluids may be used in a subterranean formation having a bottom hole static temperature of up to about 275° F. In certain embodiments, the treatment fluids may be used in subterranean formations having a bottom hole static temperature of from about 120° F. to about 300° F.

In certain embodiments, the treatment fluids may have a density in the range of from about 8 pounds per gallon ("lb/gal") to about 20 lb/gal. In some embodiments, the treatment fluids may have a density in the range of from about 10 lb/gal to about 17 lb/gal.

Figure 1:
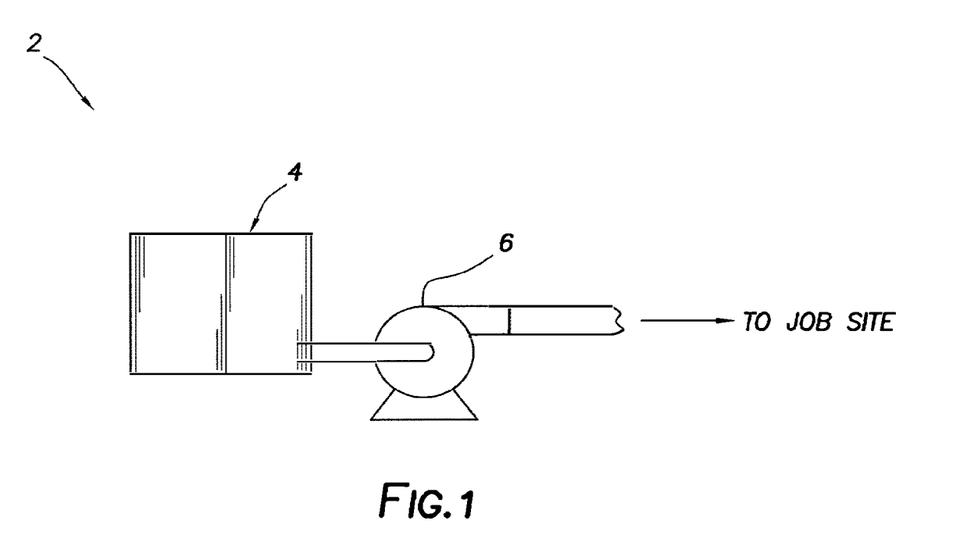
FIG. 1 is a schematic diagram illustrating a system for preparing a treatment fluid in accordance with certain embodiments of the present disclosure.

FIG. 1 is diagram of a system for preparing a treatment fluid and subsequent delivery of the treatment fluid to a location within a subterranean formation. As shown, the treatment fluid may be mixed in mixing equipment 4, such as a jet mixer, re-circulating mixer, or a batch mixer, for example, and then pumped via pumping equipment 6 to the application site. In certain embodiments, mixing equipment 4 may be used to mix the treatment fluid. In certain embodiments, forming the treatment fluid may include forming or providing a first fluid including an aqueous base fluid, a gelling agent, and a salting out inhibitor and then adding one or more salts and adding a gravel to the first fluid. For example, the mixing equipment 4 may be used to mix a first fluid including the aqueous base fluid, the gelling agent, the salting out inhibitor, and/or additives other than salts or gravel. The mixing equipment 4 may then be used to add one or more salts to the first fluid. The mixing equipment 4 may also be used to add gravel to the first fluid. In some embodiments, the mixing equipment 4 may be used to mix one or more other additives with the treatment fluid. A person of skill in the art will understand that these components of the treatment fluid could be added in a different order. In certain embodiments, the salting out inhibitor may be added to the treatment fluid prior to adding the one or more salts. Without wishing to be bound by theory, it is believed that the salting out inhibitor may occupy the anionic groups of the gelling agent or sequester salt cations, reducing precipitation of the gelling agent and preventing "salting out" of the fluid.

In some embodiments, a jet mixer may be used, for example, to continuously mix the gravel with the aqueous base fluid as it is being pumped to the wellbore. Additionally, batch mixer type units for the treatment fluid may be plumbed in line with a separate tank containing one or more additives. In some examples, mixing equipment 4 may be coupled to pumping equipment 6.

Figure 2:
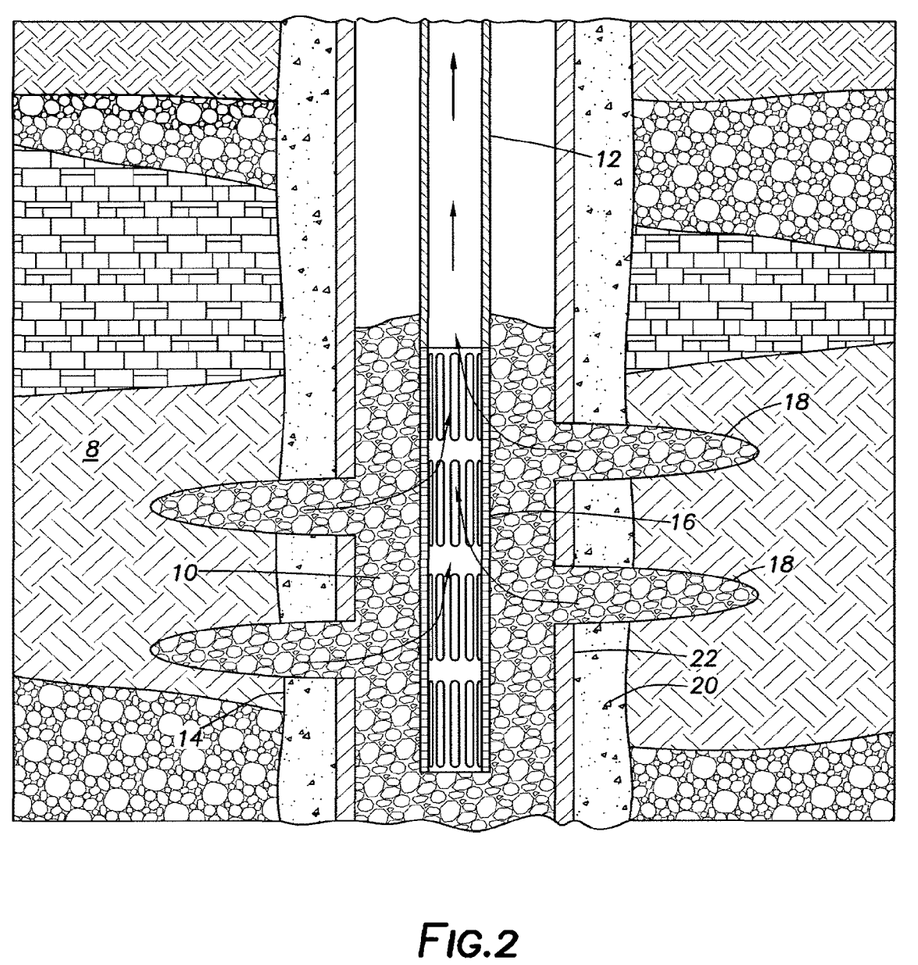
FIG. 2 is a schematic diagram illustrating a placed gravel pack within a subterranean formation in accordance with certain embodiments of the present disclosure.

FIG. 2 is a diagram of a portion of a gravel pack in a subterranean formation. The subterranean formation 8 may produce sand which may reduce or block flow of producing fluids. A treatment fluid comprising gravel may be used to filter the sand from any produced fluids. Gravel pack 10 may include gravel that has been pre-sized to a specific size. In certain embodiments, gravel pack 10 is placed into a targeted area within at least a portion of the subterranean formation 8. For example, the treatment fluids described herein may be mixed with mixing equipment 4 (as shown in FIG. 1), and then pumped into the production tubing 12 within the wellbore 14 of the subterranean formation 8 by pumping system and equipment 6 (as shown in FIG. 1). As illustrated, a gravel pack 10 may then be placed into a specific target area of the subterranean formation 8. This may be accomplished by pumping a treatment fluid to a specific target area in the portion of the subterranean formation 8 and breaking the treatment fluid (e.g., with a gel breaker), leaving the treatment fluid in the specific target area until it breaks, or leaving the treatment fluid in the target area until the gravel settles out of the treatment fluid. The remaining components of the treatment fluid may then disperse into the subterranean formation 8 or be pumped back to the surface. Once the gravel pack 10 is in place, a screen 16 may be inserted at the bottom of the production tubing 12. The screen 16 may be optional. Screen 16 may be a wire-wrapped screen and may aid in the filtration of sand or other solids from produced fluids. Once the gravel pack 10 is in place, produced fluids may flow out of the subterranean formation 8 and through perforations 18 in the cement 20 and casing 22. The gravel pack 10 may filter sand or other solids out of the produced fluids as they flow through the gravel pack 10. The produced fluids may flow through screen 16 and into production tubing 12 where the produced fluids may be pumped to the surface and collected.

Aqueous base fluids that may be suitable for use in the methods and systems of the present disclosure may include water from any source. Such aqueous fluids may include, but are not limited to fresh water, field water, acidified water, salt water (e.g., water containing one or more salts dissolved therein), brine (e.g., saturated salt water), seawater, or any combination thereof. In certain embodiments of the present disclosure, the aqueous fluids include one or more ionic species, such as those formed by salts dissolved in water. In some embodiments, the aqueous base fluid may include BRINE-DRIL-N® (a high density, polymeric, brine-based system, available from Halliburton Energy Services, Inc.) or HYDRO-GUARD®, both available from Halliburton Energy Services, Inc. For example, seawater and/or produced water may include a variety of divalent cationic species dissolved therein. In certain embodiments, the density of the aqueous fluid may be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, gelling agents, acids, and other additives included in the fluid. One of ordinary skill in the art, with the benefit of this disclosure, will recognize when such density and/or pH adjustments are appropriate. In some examples, the aqueous base fluid can comprise a monovalent brine or a divalent brine. Monovalent brines suitable for certain embodiments of the present disclosure include, but are not limited to sodium chloride brines, sodium bromide brines, potassium chloride brines, potassium bromide brines, and the like. Divalent brines suitable for certain embodiments of the present disclosure include, but are not limited to magnesium chloride brines, calcium chloride brines, calcium bromide brines, and the like. In certain embodiments, suitable salts for the one or more salts in the treatment fluids may include, but are not limited to an alkali metal halide salt, an alkaline earth metal halide salt, and any combination thereof. In some examples, the aqueous base fluid may be a high density brine. As used herein, the term "high density brine" refers to a brine that has a density of from about 8.33 lb/gal to about 19.2 lb/gal or greater. In some embodiments, the one or more salts may be present in an amount in a range of from about 9.5 lb/gal to about 12 lb/gal by volume of the treatment fluid. In certain embodiments, the one or more salts may be present in a range of from about 8.5 lb/gal to about 14.5 lb/gal by volume of the treatment fluid. In some embodiments, the one or more salts may be present in an amount in a range of from about 9 lb/gal or higher, 12 lb/gal or higher, or 14 lb/gal or higher, all by volume of the treatment fluid.

In some embodiments, the treatment fluids of the present disclosure may include a weighting agent. Examples of weighting agents suitable for certain embodiments of the present disclosure include, but are not limited to barite, hematite, calcium carbonate, magnesium carbonate, iron carbonate, zinc carbonate, manganese tetraoxide, ilmenite, NaCl, KCl, $CaCl_2$, $CaBr_2$, formate salts, and the like, and any combination thereof. These weighting agents may beat least partially soluble or insoluble in the treatment fluid. In one or more embodiments, a weighting agent may be present in the treatment fluids in an amount within a range of from about 1% to about 60% by weight of the treatment fluid (e.g., about 5%, about 10%, about 15%, about 20%, about 25%, about 30%, about 35%, about 40%, about 45%, about 50%, about 55%, etc., all by weight of the treatment fluid). In other embodiments, the weighting agents may be present in the treatment fluids in an amount within a range of from about 1% to about 35% by weight of the treatment fluid. In some embodiments, the weighting agent may be present in the treatment fluids in an amount within a range of from about 1% to about 10% by weight of the treatment fluid. Alternatively, the amount of weighting agent may be expressed by weight of dry solids. For example, the weighting agent may be present in an amount within a range of from about 1% to about 99% by weight of dry solids (e.g., about 1%, about 5%, about 10%, about 20%, about 30%, about 40%, about 50%, about 60%, about 70%, about 80%, about 90%, about 99%, etc., all by weight of dry solids). In some embodiments, the weighting agent may be present in an amount within a range of from about 1% to about 20% and, alternatively, within a range of from about 1% to about 10% by weight of dry solids.

Certain components of the treatment fluid may be provided as a "dry mix" to be combined with the base fluid and/or other components prior to or during introducing the treatment fluid into the subterranean formation. In some embodiments, the additives to the treatment fluid (e.g., a viscosifier, salt, gravel and other additives) fluid may be stored together in sealed totes or containers prior to use. Embodiments of the treatment fluids of the present disclosure may be prepared in accordance with any suitable technique. In some embodiments, the desired quantity of base fluid may be introduced into a mixer (e.g., a cement blender) followed by a dry mix. Additional liquid additives, if any, may be added to the base fluid as desired prior to, or after, combination with the dry blend. This mixture may be agitated for a sufficient period of time to form a slurry. It will be appreciated by those of ordinary skill in the art, with the benefit of this disclosure, other suitable techniques for preparing treatment fluids may be used in accordance with embodiments of the present invention.

In certain embodiments, the treatment fluids of the present disclosure optionally may include any number of additional additives. Examples of such additional additives include, but are not limited to, additional salts, additional gelling agents, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain additional rheology (viscosity and gel strength) modifiers and stabilizers. A person skilled in the art, with the benefit of this disclosure, will recognize the types of additives that may be included in the fluids of the present disclosure for a particular application.

Although depicted in FIGS. 1 and 2 for use in a gravel packing application, the methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments. In some embodiments, the treatment fluid may be introduced at a pressure sufficient to create or enhance one or more fractures within the subterranean formation (e.g., hydraulic fracturing).

The treatment fluids disclosed herein may directly or indirectly affect one or more components or pieces of equipment associated with the preparation, delivery, recapture, recycling, reuse, and/or disposal of the disclosed treatment fluids. For example, the disclosed treatment fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of treatment fluids, and any sensors (i.e., pressure and temperature), gauges, and/or combinations thereof, and the like. The disclosed treatment fluids may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), wiper balls, wiper darts, pigs, logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. An embodiment of the present disclosure is a method comprising introducing a treatment fluid comprising an aqueous base fluid, a salting out inhibitor, a gelling agent, and one or more salts into at least a portion of a subterranean formation, wherein the salting out inhibitor is selected from the group consisting of: an oligomer comprising one or more quaternary ammonium cations, a polymer comprising one or more quaternary ammonium cations, a source of one or more phosphate anions, and any combination thereof.

In one or more embodiments described in the preceding paragraph, the treatment fluid comprises a gravel material. In one or more embodiments described in the preceding sentence, the gravel material is allowed to form at least a portion of a gravel pack in at least the portion of the subterranean formation. In one or more embodiments described in the preceding paragraph, the treatment fluid is introduced at a pressure sufficient to create or enhance one or more fractures within the subterranean formation. In one or more embodiments described above, the gelling agent is a polysaccharide gelling agent. In one or more embodiments described in the preceding sentence, the polysaccharide gelling agent is selected from group consisting of: xanthan, scleroglucan, diutan, succinoglycan, guar, hydroxyethyl cellulose, a derivative of the foregoing, and any combination thereof. In one or more embodiments described above, the one or more salts are present in the treatment fluid in an amount of from about 8.5 lb/gal to about 14.5 lb/gal. In one or more embodiments described above, the one or more salts are selected from the group consisting of: an alkali metal halide salt, an alkaline earth metal halide salt, and any combination thereof. In one or more embodiments described above, the treatment fluid has an apparent viscosity of about 100 cP or less at a shear rate of 100 sec$^{-1}$ and a temperature of about 250° F. In one or more embodiments described above, the salting out inhibitor comprises a quaternary ammonium salt. In one or more embodiments described above, the salting out inhibitor comprises a polyquaternium compound. In one or more embodiments described above, the source of the phosphate anion comprises a polymer. In one or more embodiments described above, the salting out inhibitor comprises an ester of phosphonic acid. In one or more embodiments described above, the treatment fluid further comprises a gel breaker.

An embodiment of the present disclosure is a method comprising forming a treatment fluid comprising an aqueous base fluid, a salting out inhibitor, a gelling agent, and one or more salts, wherein forming the treatment fluid comprises: providing a first fluid comprising the aqueous base fluid, the gelling agent, and the salting out inhibitor, and adding the one or more salts to the first fluid; and placing the treatment fluid into at least a portion of a subterranean formation.

In one or more embodiments described in the preceding paragraph, forming the treatment fluid comprises adding a gravel material to the first fluid. In one or more embodiments described in the preceding sentence, the gravel material is allowed to form a gravel pack in at least the portion of the subterranean formation. In one or more embodiments described in the preceding paragraph, the treatment fluid is introduced at a pressure sufficient to create or enhance one or more fractures within the subterranean formation. In one or more embodiments described above, the gelling agent is selected from group consisting of: xanthan, scleroglucan, diutan, succinoglycan, guar, hydroxyethyl cellulose, a derivative of the foregoing, and any combination thereof. In one or more embodiments described above, the one or more salts are present in the treatment fluid in an amount of from about 8.5 lb/gal to about 14.5 lb/gal. In one or more embodiments described above, the salting out inhibitor comprises an oligomer comprising at least one quaternary ammonium moiety or a polymer comprising at least one quaternary ammonium moiety. In one or more embodiments described above, the salting out inhibitor comprises a quaternary ammonium salt. In one or more embodiments described above, the salting out inhibitor comprises a polyquaternium compound. In one or more embodiments described above, the salting out inhibitor comprises a source of a phosphate anion.

An embodiment of the present disclosure is a system comprising: a treatment fluid comprising an aqueous base fluid, a salting out inhibitor, a gelling agent, one or more salts, and a gravel material, wherein the salting out inhibitor is selected from the group consisting of: an oligomer comprising one or more quaternary ammonium cations, a polymer comprising one or more quaternary ammonium cations, a source of one or more phosphate anions, and any combination thereof; a production tubing; a screen coupled to the production tubing; and a pumping system fluidically coupled to the production tubing, wherein the pumping system is capable of pumping the gravel packing fluid through the production tubing. In one or more embodiments described above, the one or more salts are present in the treatment fluid in an amount of from about 8.5 lb/gal to about 14.5 lb/gal.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

The following series of tests were performed to evaluate the rheology of comparative treatment fluids comprising a salting out inhibitor. Four sample treatment fluids were prepared with salting out inhibitors and other components as indicated in Table 1 below. The samples were prepared by hydrating diutan with tap water while adding a biocide, iron control agent, and gel stabilizer. After the diutan was sufficiently hydrated, a salting out inhibitor was added. Finally, the salt concentration was increased to reach the desired density.

TABLE 1

| Component | Function | Units of Measurement | Sample 1 | Sample 2 | Sample 3 | Sample 4 |
|---|---|---|---|---|---|---|
| Tap water | Base Fluid | — | — | — | — | — |
| Glutaraldehyde | Biocide | gal/Mgal | 0.12 | 0.12 | 0.12 | 0.12 |
| Diutan | Gelling Agent | lb/Mgal | 60 | 60 | 60 | 60 |
| Sodium Citrate | Iron Control Agent | lb/Mgal | 12 | 12 | 12 | 12 |
| Sodium Thiosulfate | Gel Stabilizer | lb/Mgal | 40 | 40 | — | — |
| Poly quaternary ammonium | Salting out Inhibitor | gpt | 25 | — | — | — |
| Polyquaternium-10 | Salting out Inhibitor | lb/Mgal | — | 10 | — | — |
| Polyacrylate | Salting out Inhibitor | gal/Mgal | — | — | 10 | — |
| Hydroxypropyl starch phosphate | Salting out Inhibitor | lb/Mgal | — | — | — | 10 |
| $CaCl_2$ | Salt | ppg | 11.2 | 11.2 | 11.2 | 11.2 |

Sand settling and rheology tests were performed on the samples identified above. For the sand settling tests, a slurry of sand and 30/50 CARBOECONOPROP® proppant (at 4 pounds of proppant added per gallon) was filled in a marked glass liner, and then the liner was transferred to an autoclave and heated under nitrogen pressure to reach the testing temperature of 250° F. CARBOECONOPROP® proppant is available from Carbo Ceramics of Houston, Tex. After the test temperature was reached, the sample was cooled for 10 minutes and depressurized. The glass liner was then removed and the level of settled sand was noted after 30 minutes or 1 hour. The sand settling percentage for each sample is shown in Table 2 below.

TABLE 2

| Sample | Percent of Sand Settling after 1 hour at 250° F. |
|---|---|
| 1 (poly quaternary ammonium) | 6% |
| 2 (polyquaternium-10) | 5% |
| | Percent of Sand Settling after 30 min. at 250° F. |
| 3 (polyacrylate) | 4% |
| 4 (hydroxypropyl starch phosphate) | 6% |

Conventional gravel packing fluids often exhibit sand settling of 20% or less after 30 minutes. Thus, as shown above, the presence of the salting out inhibitor prevents salting out and provides a treatment fluid with relatively low sand settling as compared to conventional fluids even at high salt concentrations and elevated temperatures. Thus, the salting out inhibitors in samples 1-4 provide effective high density brines for gravel packing operations without salting out of the diutan gelling agent. Aqueous compositions prepared with diutan but without a salting out inhibitor salted out at concentrations of 9.5 ppg $CaCl_2$ and higher.

Example 2

Figure 3:
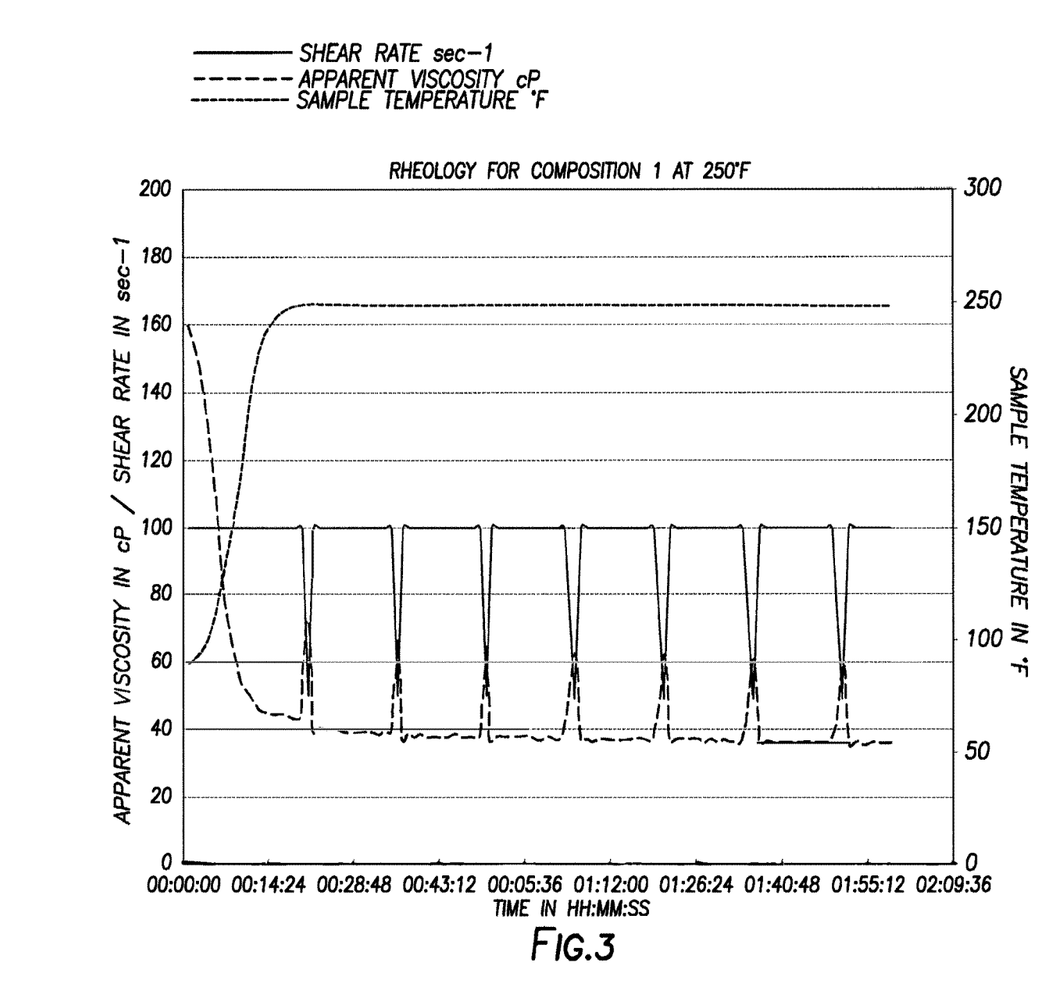
FIG. 3 is a plot illustrating certain aspects of the rheology of a treatment fluid of the present disclosure including a polyquaternary ammonium salting out inhibitor at 250° F.
Figure 4:
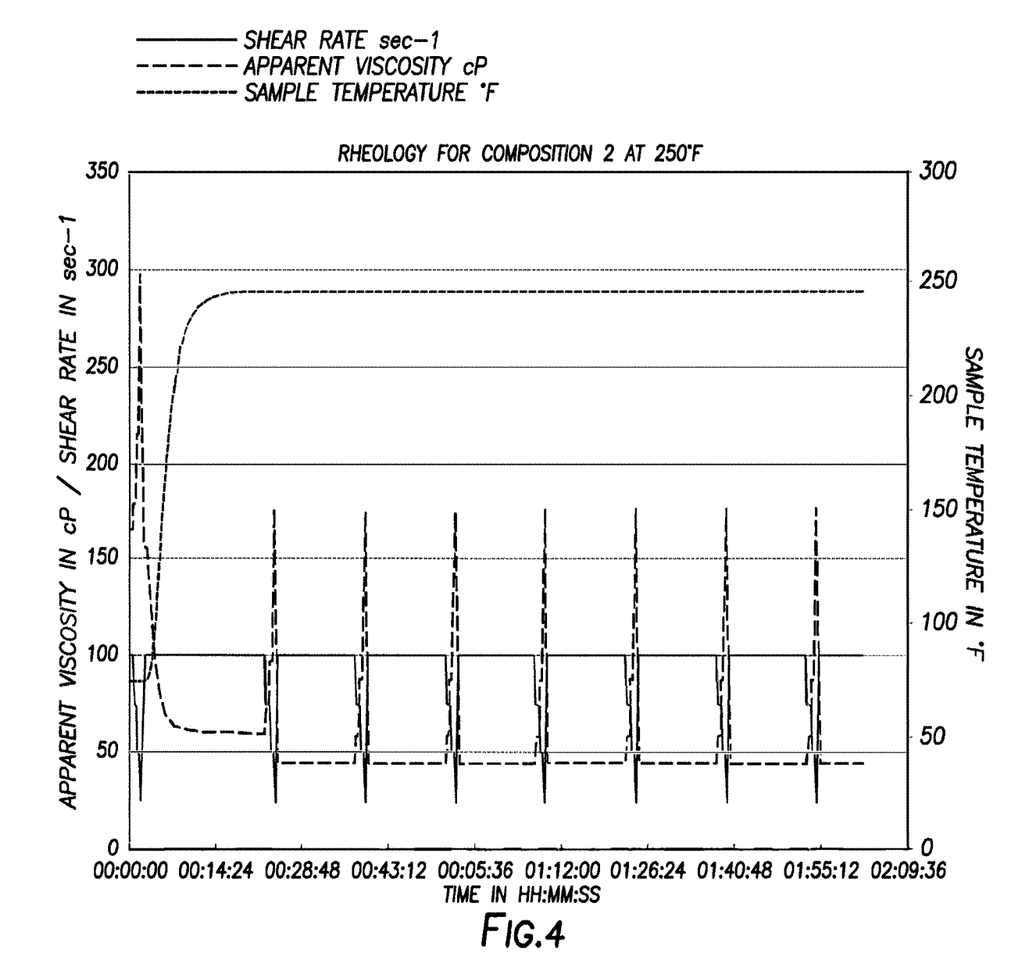
FIG. 4 is a plot illustrating certain aspects of the rheology of a treatment fluid of the present disclosure including a polyquaternium-10 salting out inhibitor at 250° F.
Figure 5:
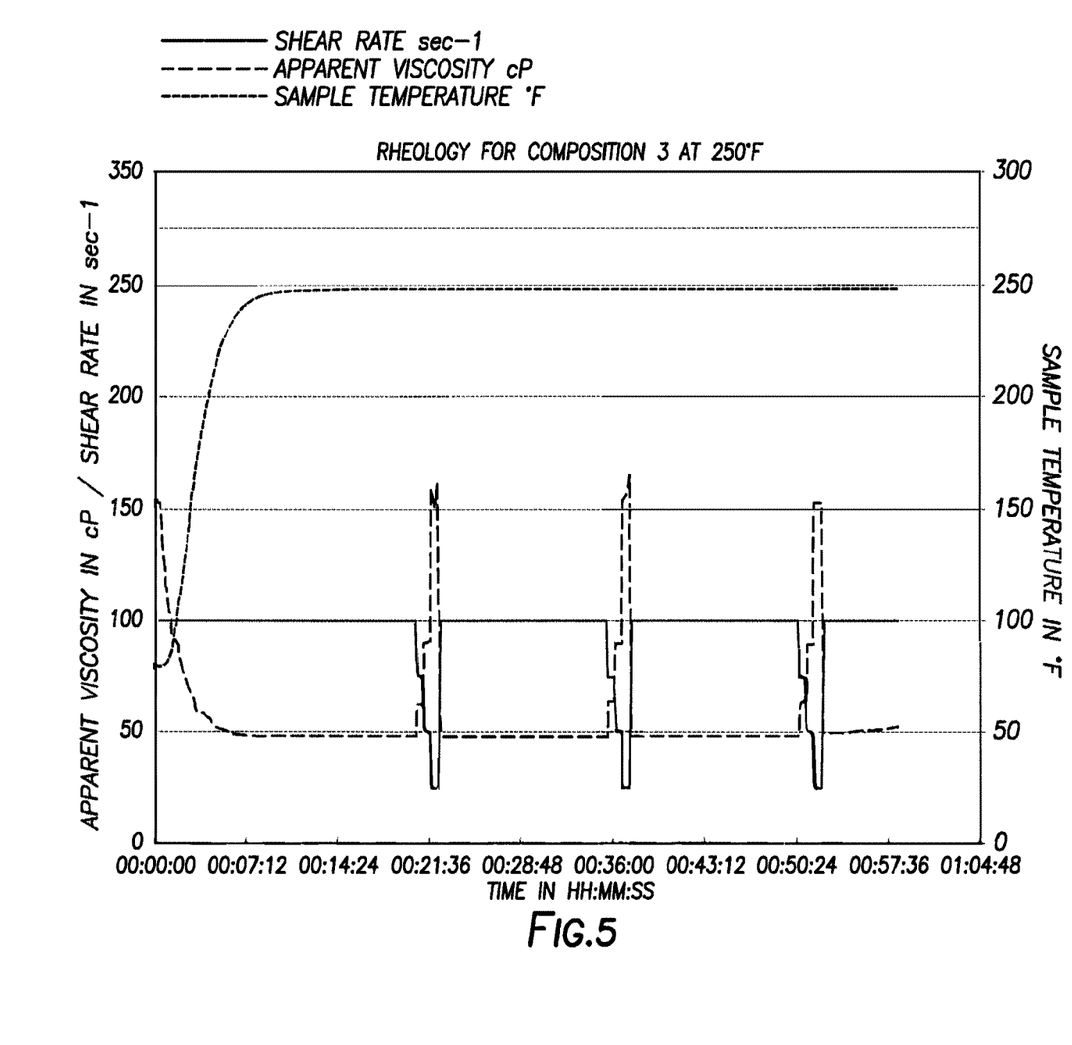
FIG. 5 is a plot illustrating certain aspects of the rheology of a treatment fluid of the present disclosure including a polyacrylate salting out inhibitor at 250° F.

After preparation, the rheology of the first three samples from Example 1 was measured at 250° F. using a Chandler Engineering® Model 5550 HTHP Viscometer. The Chandler Engineering® Model 5550 HTHP Viscometer is available from Chandler Engineering® of Broken Arrow, Okla. For each sample, viscosity was measured at a shear rate of 100 $sec^{-1}$ and then varied to observe the response in viscosity. Results of the rheology tests for sample fluids 1, 2, and 3 can be seen in FIGS. 3, 4, and 5, respectively. As shown in FIGS. 3, 4, and 5, the viscosity of the sample fluids at 100 $sec^{-1}$ is around 40-50 cP at 250° F. Viscosity measurements for conventional gelled gravel packing fluids often range from around 180 to around 250 cP at 250° F. Accordingly, these results illustrate that the viscosity of these sample fluids with salting out inhibitors is relatively low as compared to conventional fluids.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A treatment fluid comprising:
   an aqueous base fluid;
   at least one salting out inhibitor, wherein the at least one salting out inhibitor is selected from the group consisting of: an oligomer comprising one or more quaternary ammonium cations; a polymer comprising one or more quaternary ammonium cations; a source of one or more phosphate anions; and any combination thereof;
   a polysaccharide gelling agent; and
   one or more salts.

2. The treatment fluid of claim 1, wherein the treatment fluid further comprises a gravel material.

3. The treatment fluid of claim 1, wherein the polysaccharide gelling agent comprises at least one gelling agent selected from group consisting of: xanthan, scleroglucan, diutan, succinoglycan, guar, hydroxyethyl cellulose, a derivative of the foregoing, and any combination thereof.

4. The treatment fluid of claim 1, wherein the one or more salts are present in the treatment fluid in an amount of from about 8.5 lb/gal to about 14.5 lb/gal.

5. The treatment fluid of claim 1, wherein the one or more salts are selected from the group consisting of: an alkali metal halide salt, an alkaline earth metal halide salt, and any combination thereof.

6. The treatment fluid of claim 1, wherein the treatment fluid has an apparent viscosity of about 100 cP or less at a shear rate of $100 \text{ sec}^{-1}$ and a temperature of about 250° F.

7. The treatment fluid of claim 1, wherein the salting out inhibitor comprises a quaternary ammonium salt.

8. The treatment fluid of claim 1, wherein the salting out inhibitor comprises a polyquaternium compound.

9. The treatment fluid of claim 1, wherein the salting out inhibitor comprises an ester of phosphonic acid.

10. A treatment fluid comprising:
    an aqueous base fluid;
    a gravel material;
    at least one salting out inhibitor, wherein the at least one salting out inhibitor is selected from the group consisting of: an oligomer comprising one or more quaternary ammonium cations; a polymer comprising one or more quaternary ammonium cations; a source of one or more phosphate anions; and any combination thereof;
    a gelling agent, wherein the gelling agent is not hydroxy propyl starch phosphate; and
    one or more salts.

11. The treatment fluid of claim 10, wherein the gelling agent comprises a polysaccharide gelling agent.

12. The treatment fluid of claim 11, wherein the one or more salts are present in the treatment fluid in an amount of from about 8.5 lb/gal to about 14.5 lb/gal.

13. The treatment fluid of claim 11, wherein the one or more salts are selected from the group consisting of: an alkali metal halide salt, an alkaline earth metal halide salt, and any combination thereof.

14. The treatment fluid of claim 11, wherein the treatment fluid has an apparent viscosity of about 100 cP or less at a shear rate of $100 \text{ sec}^{-1}$ and a temperature of about 250° F.

15. The treatment fluid of claim 11, wherein the salting out inhibitor comprises a quaternary ammonium salt.

16. The treatment fluid of claim 11, wherein the salting out inhibitor comprises a polyquaternium compound.

17. The treatment fluid of claim 11, wherein the salting out inhibitor comprises an ester of phosphonic acid.

18. The treatment fluid of claim 11, wherein the salting out inhibitor is present in an amount of about 10 gal/Mgal or less by volume of the treatment fluid.

19. The treatment fluid of claim 11, wherein the gravel comprises sand.

20. The treatment fluid of claim 10, wherein the gelling agent comprises at least one polysaccharide gelling agent selected from group consisting of: xanthan, scleroglucan, diutan, succinoglycan, guar, hydroxyethyl cellulose, a derivative of the foregoing, and any combination thereof.

* * * * *